(12) United States Patent
Amin

(10) Patent No.: US 7,548,745 B2
(45) Date of Patent: *Jun. 16, 2009

(54) METHOD AND SYSTEM FOR DELIVERING A VOICE MAIL NOTIFICATION TO A SUBSCRIBER USING CELLULAR PHONE NETWORK

(75) Inventor: Umesh J. Amin, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 225 days.

This patent is subject to a terminal disclaimer.

(21) Appl. No.: 11/451,755

(22) Filed: Jun. 12, 2006

(65) Prior Publication Data

US 2006/0234683 A1    Oct. 19, 2006

Related U.S. Application Data

(63) Continuation of application No. 10/147,408, filed on May 15, 2002, now Pat. No. 7,062,257, which is a continuation of application No. 09/448,904, filed on Nov. 29, 1999, now Pat. No. 6,418,307, which is a continuation of application No. 08/838,613, filed on Apr. 10, 1997, now Pat. No. 6,006,087.

(51) Int. Cl.
*H04M 11/10* (2006.01)
(52) U.S. Cl. .................... 455/413; 455/415; 455/461
(58) Field of Classification Search ............ 455/412.1, 455/412.2, 413, 414, 1, 415, 426.1, 461, 455/462, 433, 554.1, 554.2, 555, 414.1; 379/88.02, 379/88.12, 88.22
See application file for complete search history.

(56) References Cited

U.S. PATENT DOCUMENTS

| 4,837,798 | A | 6/1989 | Cohen et al. |
| 5,047,763 | A | 9/1991 | Kuznicki et al. |
| 5,117,449 | A | 5/1992 | Metroka et al. |
| 5,177,780 | A | 1/1993 | Kasper et al. |
| 5,313,515 | A | 5/1994 | Allen et al. |

(Continued)

FOREIGN PATENT DOCUMENTS

EP        0631419        12/1994

(Continued)

OTHER PUBLICATIONS

International Search Report dated Oct. 20, 1998 for International Application No. PCT/US98/06913 filed Apr. 6, 1998.

*Primary Examiner*—Quochien B Vuong
(74) *Attorney, Agent, or Firm*—Davis Wright Tremaine LLP/Seattle; Michael J. Donohue; Heather M. Colburn

(57) ABSTRACT

A method and system of the present invention delivers a voice mail notification to a subscriber of a voice mail system to indicate that a voice mail message is waiting in the subscriber mailbox. The voice mail system cellular phone network. The voice mail notification typically includes the calling party number and the name of the calling party if available, and an index. This is forwarded through the cellular phone network to the subscriber to indicate that a voice mail message is waiting in a subscriber mailbox. Subscribers can retrieve a specific message from the Voice Mail System.

20 Claims, 2 Drawing Sheets

U.S. PATENT DOCUMENTS

| | | |
|---|---|---|
| 5,321,737 A | 6/1994 | Patsiokas |
| 5,355,126 A | 10/1994 | Nelson et al. |
| 5,367,558 A | 11/1994 | Gillig et al. |
| 5,390,236 A | 2/1995 | Klausner et al. |
| 5,418,835 A | 5/1995 | Frohman et al. |
| 5,434,907 A | 7/1995 | Hurst et al. |
| 5,479,408 A | 12/1995 | Will |
| 5,528,666 A | 6/1996 | Weigand et al. |
| 5,570,025 A | 10/1996 | Lauritsen et al. |
| 5,581,599 A | 12/1996 | Tsuji et al. |
| 5,630,205 A | 5/1997 | Ekelund |
| 5,706,211 A | 1/1998 | Beletic et al. |
| 5,742,905 A | 4/1998 | Pepe et al. |
| 5,745,851 A | 4/1998 | Goto |
| 5,745,852 A | 4/1998 | Khan et al. |
| 5,758,279 A | 5/1998 | Foti |
| 5,797,103 A | 8/1998 | Duda |
| 5,802,466 A | 9/1998 | Gallant et al. |
| 5,889,474 A * | 3/1999 | LaDue .................. 455/456.1 |
| 5,930,700 A | 7/1999 | Pepper et al. |

FOREIGN PATENT DOCUMENTS

| | | |
|---|---|---|
| EP | 0682457 | 11/1995 |
| EP | 0689336 | 12/1995 |
| EP | 0831664 | 3/1998 |
| WO | 9526113 | 9/1995 |
| WO | 9531078 | 11/1995 |
| WO | 9638010 | 11/1996 |
| WO | 9720442 | 6/1997 |
| WO | 9750224 | 12/1997 |
| WO | 9800985 | 1/1998 |

* cited by examiner

METHOD AND SYSTEM FOR DELIVERING A VOICE MAIL NOTIFICATION TO A SUBSCRIBER USING CELLULAR PHONE NETWORK

CROSS REFERENCE TO RELATED APPLICATIONS

This application is a continuation of application Ser. No. 10/147,408, filed May 15, 2002, now U.S. Pat. No. 7,062,257, which is a continuation of application Ser. No. 09/448,904, filed Nov. 29, 1999, now U.S. Pat. No. 6,418,307, which is a continuation of application Ser. No. 08/838,613, filed Apr. 10, 1997, now U.S. Pat. No. 6,006,087, all of which are incorporated herein by reference.

FIELD OF THE INVENTION

This invention relates generally to a method and system of delivering a voice mail notification to a subscriber of a voice mail system to indicate that a voice mail message is waiting in a subscriber mailbox.

BACKGROUND OF THE INVENTION

Currently some wireless services offer message waiting and similar services where various types of messages can be stored in a subscriber mailbox of a voice mail system and then delivered through a wireless communication network such as a cellular telephone network after a call is specifically made to a voice mail system to retrieve the messages. In prior systems, the number of stored messages can be determined by looking on the display of a phone that has been powered-on, and viewing the number of messages that are waiting in the voice mail system. However, knowing only the number of messages stored in a voice mailbox is not efficient for active users and subscribers who need up-to-date information for business, education and other purposes.

SUMMARY OF THE INVENTION

It is therefore desirable if a wireless communication network, such as the cellular telephone network, could forward a voice mail message notification (or message waiting indicator) to a subscriber of a voice mail system indicating that the subscriber has one or more voice mail messages waiting in the subscriber mailbox. In the present invention, the voice mail system can generate a voice mail notification that includes the calling number of the party that left the voice mail message, if known, the name of the caller, and an index listing the various calls so that a subscriber can scroll through the calls and choose a desired call. This caller identity information can be forwarded as a packet of information to a cellular network.

A messaging center in the cellular network receives the voice mail notification, which includes calling number ID, potentially the caller name (if available) and the index of the voice mail. The messaging center then forwards the notification to a (MSC) mobile switching center, which in turn forwards the voice mail notification to a base station. The information is then forwarded to a cellular phone operated by a subscriber. Typically, the subscriber's cellular phone must be registered with the cellular phone network before a voice mail notification is sent. Also, the message center may communicate with the home location register to determine the location of the subscriber who is to receive the voice mail notification. The home location register maintains a record of the location of any subscriber as long as the subscriber has a cellular phone or other similar wireless device that is registered with the system.

The cellular phone typically will have a storage device and display for storing and displaying a plurality of voice mail notifications. The display can show the calling party number, and if known, the calling party name after it receives the voice mail notification, as well as an index which includes an appended number corresponding to the voice mail. The cellular phone preferably stores within the phone an index of all voice mail messages stored in the subscriber mailbox based on the voice mail notification it receives. The display then can be scrolled to indicate the various identities of the stored messages. The cellular phone used by a subscriber can be an IS 136 phone. The subscriber can retrieve a specific message by highlighting a specific message and then pressing a send button positioned on the phone. The mobile network then forwards the particular voice mail message to the subscriber. The mobile network than facilitates the message retrieval to the subscriber device.

BRIEF DESCRIPTION OF THE DRAWINGS

This invention and its mode of operation will be more clearly understood from the following detailed description when read with the appended drawings in which.

Throughout the drawings, the same element when shown in more that one figure is designated by the same reference numeral.

DETAILED DESCRIPTION

Figure 1:
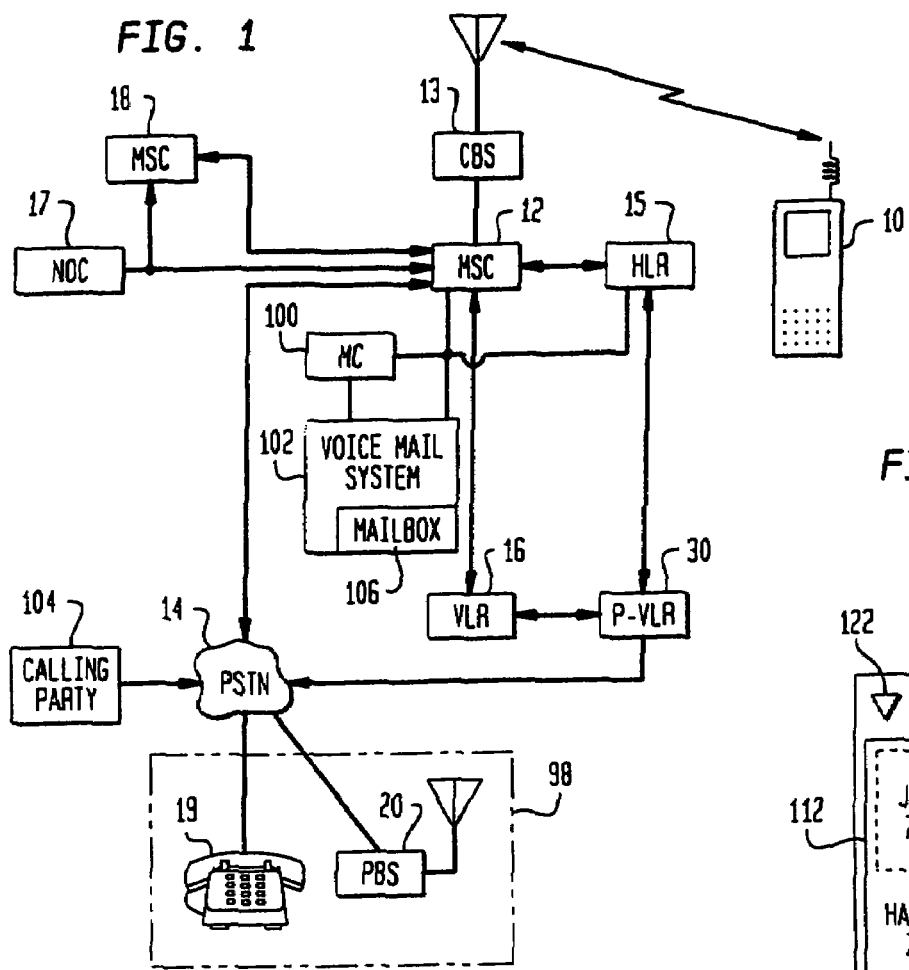
FIG. 1 shows a simplified block diagram of a cellular switching system, its logical entities as well as its relative connection with the public switched telephone network, a private base station and a voice mail system operatively connected for communication with the cellular network for delivering a voice mail notification to a subscriber.

Referring now to FIG. 1, there is shown a simplified block diagram of a cellular switching system forming part of a wireless cellular phone network, its logical entities as well as the relative connection with the public switched telephone network and a private base station. A messaging center receives a small packet of information, corresponding to a voice mail notification, also called a message waiting indicator from a voice mail system, indicating that a subscriber has a voice mail message waiting in a subscriber mailbox, [along with the index of the voice mail, the calling number ID, the calling party name, an the MIN—Mobile Identification Number]. This voice mail notification is forwarded to a mobile wireless device, in the illustrated embodiment a cellular telephone belonging to a subscriber of the voice mail system. Other wireless devices could also be used, including one and two-way wireless pagers. The cellular concept is well known and is described in general in the *Bell System Technical Journal*, Volume 58, Number 1, January 1979, and specifically in an article entitled *The Cellular Concept* by V. H. MacDonald, on pages 15 through 41 of this journal, the disclosure which is hereby incorporated by reference.

Included within the cellular switching system is mobile station (MS) 10, mobile switching center (MSC) 12, the public telephone switched network (PSTN) 14, a cellular base station (BCS) 13, a home location register (HLR) 15, a visiting location register (VLR) 16, a private base station visiting location register (P-VLR) 30, and a private base station (PBS) 20 used in conjunction with a premises. A subscriber station telephone set 19 is illustratively shown connected to the public telephone switched network 14 in a well known manner. In this particular example, the private base station 20 is illustrated as part of a residential premises, shown with the dotted lines at 98. A mobile station 10 in the form of the cellular phone is shown outside the premises. A messaging center is illustrated by block 100, and is connected to the voice mail system (VMS) 102, the Home Location Register 15, and all Mobile Switching Centers 18 in the network via Signalling System 7 (SS7), which is a separate system, but could be integral to the cellular network. Although a private base station is not essential for practicing the invention, the use of private base stations in now commonplace, and the description proceeds with the disclosure of a private base station.

For clarity, mobile switching center 12 is illustratively shown connected to mobile switching center 18 and network operation controller (NOC) 17. The mobile switching center 18 is part of the overall cellular systems operation and may similarly have a home location register, a visiting location register, a P-VLR, as well as multiple cellular base stations associated therewith. It is understood that other mobile switching centers also may be part of the cellular system. The network operation controller provides overall control and thereby ensures that the operation of the whole cellular system is supported and serviced.

The mobile station 10 and base station 20 are designed to operate in a cellular system in accordance with the Telecommunications Industry Association (TIA) Interim Standard (IS)-136, dated December 1994.

The mobile switching center 12 performs all the switching functions related to call delivery and is interconnected to the public telephone switched network 14, the home location register 15, the visiting location register 16 and the cellular base station 13.

The home location register 15 maintains a data base, profile record and call routing information or a pointer to the call routing information for all mobile stations in a particular assigned home area. The visiting location register 16 maintains a data base for call routing information or a pointer to the call routing information for those mobile stations which are visiting its assigned area of coverage and have active registration with the associated MSC.

The private base station visiting location register 30 performs the interface functions between a private base station, such as station 20, and both the home location register 15 and the visiting location register 16 for holding both call routing information and, order or registered position information for the mobile stations that are currently registered with the private base station. The private base station visiting location register 30 is also responsible for administering spectrum utilization and operations of the private base station 20.

The functions for the private base station visiting location register 30 may be conveniently summarized as follows:
1. Authorize new private base station operation.
2. Download private base station operating parameters and performs operation administration.
3. Authenticate all calls received from private base station.
4. Perform Registration Notification task to HLR/VLR when network update is received from private base station.
5. Perform mobile station inactive task to HLR/VLR when network cancellation is received from private base station.

The private base station 20 qualifies for private (or non-public) mode time-division-multiple-access (TDMA) cellular operation under IS-136 cellular radio interface, which permits a cellular mobile station to register with a private base station to receive or originate calls through a land-line connected to the public telephone switched network instead of through a cellular base station, such as cellular base station 13, connected in the regular public cellular system. Specifically, this radio interface provides the digital control channel in accordance with TIA-IS-136.1 and the traffic channels and control channel in accordance with TIA IS-136.2 for communication with the mobile station. A modem interface between the private base station and the private base station visiting location register also is supported by the radio interface.

As shown in FIG. 1, a voice mail system 102 is operatively in communication with the mobile switching center 12 and visitor location register 16 as well as the messaging center 100. When a call is made to a subscriber of the voice mail system 102, from a calling party 104 and the subscriber, does not answer, the mobile switching center 12 can switch the call to the voice mail system 102 which requests the calling party 104 to leave a message in a subscriber mailbox 106. The voice mail system 102 can be a separate system apart from the public switched telephone network 14, part of the public switched telephone network, or integral with the cellular telephone network 9.

The small packet of information which corresponds to the voice mail notification contains the number of the calling party, and if known, the name of the calling party, and the voice mail index. This information can be obtained by means well known to those skilled in the art. This packet of information is sent as a voice mail notification to the messaging center 100. The messaging center through its interaction determines the correct mobile switching center 12 and forwards the message. The mobile switching center 12 then forwards the message to the cellular base station 13 to the subscriber, who has a cellular phone or other mobile device that can display the voice mail notification, e.g., such as the calling party and the name of the calling party, as well as the index. If the subscriber is using a cellular phone with advanced features, then much of the information contained in the voice mail notification can be forwarded along a digital control channel. Examples of a type of cellular phone that can be used with the present invention includes an IS-136 cellular phone.

Figure 2:
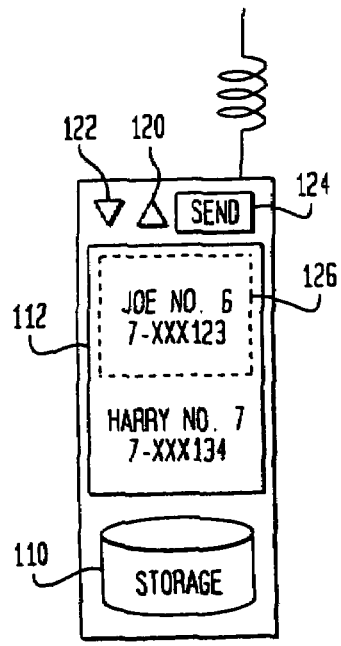
FIG. 2 illustrates a block diagram of a cellular phone showing a storage device for listing items of voice mail notification and a display for showing this information.

The cellular phone includes a storage device 110 and display 112 as shown schematically in FIG. 2, which stores the various voice mail notifications received from the network and displays this information on the display, typically on an LCD screen. Typically, the call number of the calling party and if known, the name of the calling party will be displayed, as well as an index having numbers appended corresponding to the message in the mailbox.

As illustrated, the display 112 includes a large screen, to allow more than one party and number to be displayed, as well as an appended number corresponding to the voice mail message index. For example, the voice mailbox 106 may have seven messages waiting. The display has two messages displayed, indicating party Joe and party Harry, respectively messages 6 and 7 (the index) and the respective telephone numbers.

The telephone includes two up and down scroll key buttons 120, 122 and a send button 124 or it can have soft keys to scroll up and down. The user of the phone can scroll up and down through the messages. When a particular message is desired, it is highlighted, as indicated by the dotted lines 126, and the send button 124 is then depressed. The particular highlighted message, in this case the message from Joe. Naturally, if the subscriber knows a particular message which is desired such as message no. 5, messages can be scrolled until message no. 5 is highlighted. The send button 24 is depressed and message no. 5 retrieved.

One example of the method used to retrieve the voice mail message is explained below. A message can be highlighted by depressing the scroll keys or soft keys, one soft key corresponding to an up button, and a second soft key corresponding to a down button. When a particular message is highlighted, a send or retrieve button could be depressed, or another soft key depressed once or twice. As soon as the send or retrieve button is depressed, the phone dials the voice mail system and communicates with the system, and instructs it to play the specified message.

Figure 3:
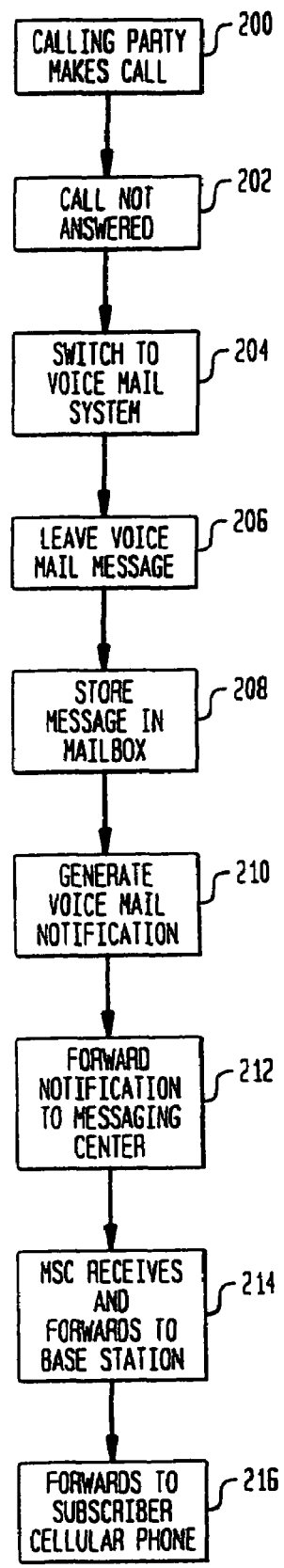
FIG. 3 shows a high level flow chart depicting one example of the invention in operation.

FIG. 3 shows a basic flow chart illustrating one method that can be used for the present invention. For purposes of clarity, the method is described beginning with numerals starting in the 200 series. As illustrated, a calling party 104 makes a call (Block 200) which is not answered (Block 202). The call is switched to the voice mail system (Block 204). The calling party leaves a voice mail message (Block 206) and stores that message in the subscriber mailbox (Block 208). The voice mail system then generates a voice mail notification in the form of a small packet of information such as the MIN—Mobile Identification Number, calling number, if known, the name of the calling party, and the index (Block 210). The voice mail notification is then forwarded to a messaging center of a cellular telephone network (Block 212). The mobile switching center then receives the voice mail notification (Block 214) and forwards it to a base station which transmits the notification by wireless means to a cellular telephone owned by a subscriber of the voice mail system (Block 216).

There is now described a private base station that can be used in conjunction with the present invention. Private base stations are becoming more common because they can save money for subscribers for otherwise expensive cellular services.

The private base station 20 is limited to a very low level of transmitted power of restricting its coverage range to a relative small area. This allows the private base station to reuse the same radio frequency spectrum used by the macro cellular systems as long as the frequency of use selected by the private base station is different from the cell for the regular public or macro cellular system in whose area of coverage the private base station is located. The operating frequency spectrum for the private base station is selected in a way that insures no interference to the macro cellular system. This is achieved by directing the private base station to perform channel scanning and interference measurements before selecting its operating frequencies. While operating in its normal mode awaiting receipt of an incoming call or an off-hoke request from a registered mobile station, the private base station 20 continually broadcasts digital control channel information containing its identity and system parameters.

An IS-136 compliant mobile station can search for a privative base station's control channel transmission using a number of techniques. One of these may be based on the mobile station's prior knowledge of the private base station's existence. Another may be in response to a mobile station user manually directing the mobile station to search for the private base station. In yet another technique the mobile station, upon finding the control channel of the private base station, automatically goes through a series of controlled procedures to obtain registration with the private base station.

Once a mobile station, for example, station 10, obtains a successful registration with the private base station 20, the private base station 20 makes a modem connection to the private base station visiting location register 30 to update the mobile station's temporary line dialing number (TLDN). The temporary line dialing number in this case will be the private base station's land-line number (LLN). Hence, when an incoming call is directed to a particular mobile station, information including the temporary line dialing number for this mobile station is accessed from the private base station visiting locating register 30 through the home location register 15 or the visiting location register 16 and the call routed to the private base station's LLN. It is also understood that the temporary line dialing number may be stored in either the home location register 15 or the visiting location register 16, and the mobile switching center 12 then accesses this TLDN from this register. The private base station 20 detects the ring for an incoming call and sends an alerting signal or page to the registered mobile station. Following the mobile station's response to the alerting signal, private base station 20 establishes a traffic channel for the mobile station and generates an off-hook condition to connect the incoming call through the private base station to the mobile station.

The private base station 20 supports the registering of multiple mobile stations and provides a personalized call delivery feature for each registered mobile station. In order to provide the personalized call delivery feature, during the TLDN update for the mobile station at the private base station visiting location register 30, additional information elements, i.e., digits, are added to the TLDN update for distinguishing a particular mobile station with the private base station 20. During the registration of a mobile station with the private base station, a local unique address is generated at the private base station. This local unique address may be either advantageously generated from the mobile station identification number contained in each mobile station or generated from an ordered position assigned by the private base station for each portable station registered with the private base station.

Thus by way of illustrative example of the operation of the ordered position registration, the mobile station that registers with the private base station 20 is inserted in registered position 1 by the private base station visiting location register 30, and the second mobile station is inserted in registered position 2 by the private base station visiting location register 30 and so forth. This ordered position information is advantageously treated as the local unique address or a sub-address by the private base station 20 for each mobile station registered with it. A distinct identity of binary digits for each mobile station distinguishing it from all other mobile stations registered with private base station 20 is obtained thereby.

The private base station receives the binary digits describing the order of registered position in the same manner as caller-ID delivery is achieved. The ordered position information is appended to the caller-ID message that accompanies an incoming ring signal or is appended to the time slot allocated for the caller-ID message when such message is not present. Switching offices that provide caller ID messages to a telephone station capable of decoding and storing the incoming telephone number are either shown or described in U.S. Pat. No. 4,277,649 which issued to D. Sheinbein on Jul. 7, 1981.

Knowing the order of registered position, the private base station along with the help of a mobile station user's profile stored in the private base station can support additional features like 1. Caller name display on the phone;
2. distinctive alerting;
3. Call blocking;
4. Incoming call log; and
5. Telephone answering device/message support.

Figure 4:
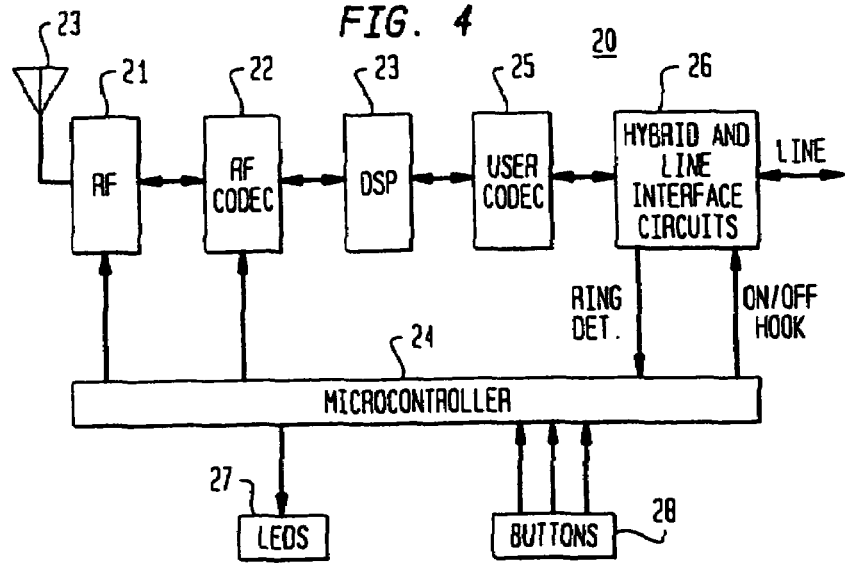
FIG. 4 shows a high level block diagram of a private base station separated into identifiable circuit sections.

Shown in FIG. 4 is a high-level block diagram of private base station 20 separated into identifiable circuit sections. A radio frequency (RF) circuit 21 performs the radio frequency signal processing. Included in this circuit is a radio frequency receiver section which receives the radio frequency signal from the mobile stations 10 and 11 and, after appropriate filtering and down conversion, produces I and Q signal for an RF CODEC 22 which is connected to the RF circuit 21. A radio frequency transmit section in RF circuit receives the I and Q signals from the RF CODEC 22, converts these signals to the appropriate radio frequency range and amplifies them for wireless transmission via antenna 23.

The RF CODEC 22 performs analog-to-digital (A/D) conversion of the I and Q signals received in the receiver section of the RF circuit 21 and digital-to-analog (D/A) conversion of the I and Q signals provided to the transmitter section of the RF circuit 21. The RF CODEC 22 also performs modulation for the transmission path.

Connected to the RF CODEC 22 is a digital signal processor (DSP) 23 which performs all the baseband signal processing for the private base station applications. This involves speech encoding/decoding, time-division-multiple-access framing/deframing, channel encoding/decoding, and other modem functions such as, for example, automatic gain control, symbol timing recovery, synchronization, and the like. The DSP 23 also communicates with a microcontroller 24 for exchanging control messages. A user CODEC 25 performs conversion of digitally sampled speech signals to analog speech signals and also performs conversion of analog speech signals to digitally sampled speech signals.

Connected to the user CODEC 25 could be a switch (not shown) used for switching the private base station into communication with the wireless cellular network 19 for the land-line PSTN 14. The switch could be connected to a second cellular circuit (not shown), and in parallel with RF unit 21 and a hybrid and line interface circuits interface section 26 which performs the required functions for interfacing the private base station 20 to the public switched telephone network 14. These include such functions and circuits as, for example, switch-hook operations, hybrid, ring detect, line termination, on/off hook signal interface signals and the like. The microcontroller 24 performs the call processing functions between the private base station 20 and any registered mobile stations as well as all other control functions that are required for operation of the private base station 20. LEDs 27 provide visual feedback to a user who makes entries at the private base station. Buttons 28 connect to the microcontroller 24 and are used in making the entries in the private base station 20. Once such entry, as described later herein, is that made by the primary user of the base station who direct this base station to register a mobile station for the first time.

This private base station visiting location register 30 may be geographically located away from or co-located with either a visiting location register or a home location register, with which it receives and provides private base station information. Moreover, the functions provided by the private base station visiting location register 30 also may be integrated into a visiting location register or a home location register, and such operation is hereby anticipated. The elements employed in the private base station register typically can include a computer modem control interface modules, disk storage unit and a plurality of databases.

Data communication are provided between multiple private base stations and the private base station visiting location register through the public telephone switched network. In providing this communication, any number of well known protocols that exists in the industry today may be used. By way of example, modem protocols such as V.22, V.22 bis or Bell 212 are all suitable for communications between the modem and a private base station through the public telephone switched network. It is also possible to have a packet data protocol provide the two-way communications requirement. For example, an X.25 packet data protocol may be used in providing this communication.

The databases contain specific information. Such as frequency allocations of surrounding cellular systems and information of private base stations operating parameters determined by the private base station's location. Examples of a private base station operating parameters are its operating frequency, transmitted power, authorization time, and the like. A Database could also contain mobile station order of registered position information with the private base station and also private base station profiles. Examples of private base station profiles are "Call Waiting" and "Caller ID" that are provided by the public telephone switched network, and also any private base station location register 30. It is to be understood that other databases providing additional services or tasks also may be interfaced with the computer via a peripheral control interface module.

The disk storage contains operational information that is applicable to the cellular system in general, such as operation parameters that are required for interfacing the private base station visiting location register with home location register and visiting location register.

A mobile station, such as mobile station 10, gains access to a private base station, such as private base station 20 through a registration/network update process.

A private base station is able to provide distinctive alerting for a registered mobile station. The user of a registered mobile station can have, for example, a distinctive ringing sound (chosen from a group of ring sounds) associated with a particular calling party stored in his or her directory. Distinctive ringing is illustratively described in U.S. Pat. No. 4,995,075. When an incoming call is from the particular calling party, the private base station is able alert the mobile station using the distinct ringing sound.

A private base station is also able to provide a number of other advantageous functions based on obtaining an order of registered position for each of mobile stations. Features such as call blocking, an incoming call log, such as described in U.S. Pat. No. 5,386,460, and a telephone answering function with personalized mailboxes are easily provided. For call blocking, the user has a choice of blocking an incoming call which number matches one of specified numbers stored in the directory. The incoming call log is advantageously provided in the private base station for each of the registered mobile station users. And the private base station allows personalized greetings to be stored in a mailbox for each of the registered mobile stations. When an incoming call is directed to a particular mobile station and the user of this station does not respond, this personalized greeting is played to the calling party by the private base station.

The advantages and beneficial features of the present invention now permits a voice mail notification to be forwarded from the network or private voice mail system to a messaging center which then forward the voice mail notification through the mobile switching center and base station to a cellular telephone.

What has been described is merely illustrative of the present invention. Other applications to wireless telephones, computers or other communication systems other than the disclosed system are contemplated as being within the knowledge of one skilled in the art and may be utilized without departing from the spirit and scope of the present invention.

I claim:

1. A cellular telephone network comprising:
a cellular base station, wherein the base station is configured to:
forward a voice mail notification associated with a voice mail message to a first mobile device configured to display the voice mail notification, wherein the voicemail notification identifies the calling party; and
forward the voice mail notification to a second mobile device configured to display the voice mail notification.

2. The cellular telephone network of claim 1, wherein the cellular base station is a private base station.

3. The cellular telephone network of claim 1, wherein the voice mail notification further comprises a number of the calling party and an index.

4. The cellular telephone network of claim 1, wherein the voice mail notification is forwarded to the mobile device along a digital control channel.

5. The cellular telephone network of claim 1, wherein the base station provides a voice mailbox for the first mobile device and the second mobile device.

6. The cellular telephone network of claim 5, wherein the base station stores a first mailbox greeting for the first mobile device and a second mailbox greeting for the second mobile device.

7. The cellular telephone network of claim 1, wherein the cellular base station is further configured to forward the voice mail message associated with the voice mail notification to the first mobile device in a response to receiving a retrieval indicator from the first mobile device.

8. The cellular telephone network of claim 1, wherein the cellular base station is configured to provide a specific ringtone to the first mobile device according to an association between the specific ringtone and a specific calling party.

9. The cellular telephone network of claim 1, wherein the first mobile device comprises a display and a storage device.

10. The cellular telephone network of claim 9, wherein the display is configured to display two or more voice mail notifications.

11. The cellular telephone network of claim 1, further comprising a mobile switching center, wherein the mobile switching center is configured to forward a voice mail notification to the cellular base station.

12. The cellular telephone network of claim 1, wherein the voice mail notification further comprises a name associated with the calling party.

13. The cellular telephone network of claim 1, wherein the first mobile device and the second mobile device are configured to transmit a request for the voice mail message.

14. The cellular telephone network of claim 13, wherein the first mobile device is configured to transmit the request for the voice mail message in response to a user input.

15. The cellular telephone network of claim 14, wherein the first mobile device comprises a soft key, and wherein the user input comprises a soft key being depressed twice.

16. The cellular telephone network of claim 1, wherein the first mobile device and the second mobile device are Configured to display a list of forwarded voice mail notifications.

17. The cellular telephone network of claim 1, wherein the first mobile device includes a storage device and a display.

18. The cellular telephone network of claim 17, wherein the first mobile device is configured to display two or more voice mail notifications.

19. The cellular telephone network of claim 18, wherein the first mobile device displays an index associated with the two or more voice mail notifications.

20. The cellular telephone network of claim 17, wherein the first mobile device is configured to store one or more voice mail notifications.

* * * * *